3,244,558
ULTRAMARINE TEXTILE INKS
Kam H. Chan, Huntington, W. Va., assignor, by mesne assignments, to Holland-Suco Color Company, Holland, Mich., a corporation of Michigan
No Drawing. Filed Aug. 11, 1961, Ser. No. 130,742
14 Claims. (Cl. 117—38)

This invention relates to an improved textile coloring ink and to the method of its preparation. More particularly, the invention is concerned with Ultramarine Blue inks of the oil-in-water type which exhibit improved crocking and wash resistance when applied to textiles.

Textile inks customarily comprise aqueous dispersions of insoluble pigments, together with a resin binder capable of causing the pigment to adhere to textile fibers. Such dispersions may be either oil-in-water or water-in-oil types. A type of pigment which is especially desirable for textile inks is that known as Ultramarine Blue, which is a blue inorganic pigment consisting essentially of a complex sulfoalumino silicate.

Ultramarine Blue pigments possess excellent and attractive color characteristics but the tendencies of heretofore known Ultramarine Blue textile inks toward crocking and lack of good wash resistance when applied to textile materials have retarded the more extensive adoption of these valuable pigments for textile coloring use. This has been true both of oil-in-water and water-in-oil types of inks.

Previously known oil-in-water type inks have involved efforts to incorporate dry Ultramarine Blue into an oil-in-water emulsion, but Ultramarine is sufficiently hydrophilic not to be wet by the emulsion (oil) ingredients. Hence, oil-in-water emulsions of Ultramarine Blue have been proposed in which the emulsion is prepared by first forming an emulsion of a resin binder in water and then pigmenting this emulsion. Emulsions thus prepared have been inadequate in regard to resistance to crocking. Since it was known that hydrophobic pigments can be made into dyeing emulsions by first dispersing such pigments in a resin solution and then emulsifying the resulting lacquer into water containing a dispersion to obtain a water-in-lacquer (oil) type emulsion, efforts have also been made to adapt Ultramarine Blue for this purpose by rendering it hydrophobic by coating particles of the pigment with a thin layer of a thermosetting or silicone type resin having water repellent properties. This has required prolonged processing time and has added to production costs. Moreover, the resultant crocking and wash resistance properties of the ink have failed to meet the necessary standards.

In accordance with the present invention, there is provided a novel Ultramarine Blue textile ink and method for its preparation. The crocking and wash resistance of textiles colored with the novel ink composition of the invention is so greatly and unexpectedly improved that the disadvantages attendant upon the use of known Ultramarine Blue preparations are substantially overcome.

The novel textile ink of the invention comprises a pigmented aqueous dispersion of the oil-in-water type, in which all the pigment is present in the discontinuous (oil) phase, is pre-wetted by the oil, and is resin-bonded. In accordance with the invention, the pigment employed is a hydrophilic pigment, preferably an Ultramarine Blue pigment, and therefore the preparation of the inks of the invention will be illustrated with respect to Ultramarine Blue. However, it should be understood that the broad concept of the invention is not to be considered as confined thereto.

In accordance with one embodiment of the invention, there is provided a pigmented aqueous dispersion of the oil-in-water type in the form of a color concentrate. This color concentrate may, in accordance with a second embodiment of the invention, be converted into a textile ink by addition of a suitable extender.

The preparation of the color concentrate includes these steps: In the first step, the oil phase of the dispersion is prepared by incorporating dry Ultramarine Blue into a solution of a resin binder in an organic solvent or diluent to form a thick paste having the pigment uniformly distributed therethrough. The incorporation of the pigment in the resin solution may take place in any suitable type of equipment, such as a mixing tank equipped with agitator, and this may be followed by further mixing in a set of rolls, to achieve smoothness and homogeneity.

The second step involves preparation of the aqueous phase of the color concentrate which is basically a solution of a surfactant, but which may also include auxiliary ingredients, such as a stabilizer, and a thickener. The surfactant, stabilizer, and thickener are preferably prepared as separate solutions which are then mixed in any suitable type mixer, such as a colloid mill, for example, an Eppenbach mixer.

In the third step, the pigment-resin solvent paste is emulsified with the aqueous phase in a colloid mill.

In a fourth and final step, there is added to the emulsion resulting from the third step, an anticrocking agent comprising an aqueous emulsion of a natural or synthetic elastomeric polymer, designated hereinafter, for convenience, as a latex emulsion. Upon thoroughly mixing the latex emulsion with the previously prepared pigment emulsion there is obtained the color concentrate of the invention.

In accordance with a further embodiment of the invention, a textile ink is prepared from the aforementioned color concentrate by adding to the color concentrate a clear extender comprising an oil-in-water type emulsion of one or more organic solvents or diluents in an aqueous phase with or without the inclusion of a resin. The aqueous phase resembles in general composition the aqueous phase of the color concentrate, but does not have to be identical therewith. The proportion of clear extender added to the color concentrate will depend upon the shade desired in the final ink, and may range from about 1:1 to about 1:50, but it will be understood that these ranges are illustrative and are not critical.

The textile inks of the present invention can be applied to a wide range of textile fibers and fabrics by conventional procedures. They are particularly suited for textile printing, and can be applied to virtually all textile fabrics that are commonly colored by printing methods, including textiles made from natural and synthetic fibers and mixtures thereof. Such fabrics include for example, cotton, silk and wool (although long nap wool materials, such as velvet, offer difficulty), regenerated cellulose (rayon), cellulose esters and ethers, such as cellulose acetate, polyesters types, such as polyethylene terephthalate (Dacron), and the like, and inorganic materials such as woven glass.

The textile inks of this invention are applied to textiles in accordance with conventional coloring methods well known to those skilled in the art. After the ink has been applied, the printed or otherwise colored material is subjected to a drying step to remove water and volatile solvents. Depending upon the type of resin binder employed, the textile may be subjected further to a curing step, such as oxidation and/or heat treatment, for a sufficient period of time to cure the resin binder and to render it insoluble and nondispersible. The temperature employed must, of course, be below that at which damage to the fabric occurs. With materials such as cotton, linen and the like, the curing step is preferably carried out at a temperature within the range of about 280° F.–320° F., preferably at about 300° F. For synthetic textiles, the temperature employed must be below that at which the resin melts or is otherwise damaged by heat. For textile materials such as felted or woven glass fabrics, the permissible temperatures may be higher and are governed by the temperature at which the resinous binder component of the ink is damaged or rendered unduly hard and brittle.

The preparation and properties of the novel color concentrates and textile inks of the invention are now described in detail.

In the preparation of the color concentrate and ink, there may be effectively employed any Ultramarine Blue type pigment having a particle size less than about 10 microns, but this limit is not to be taken as critical. Preferably the particle size of the pigment will lie in the range from about 0.5 to 5.0 microns. Examples of Ultramarine Blue pigments which can be successfully employed include the Ultramarine Blue identified as Code UB-9171, having a particle size range of substantially 0.3 to 1.0 microns, and a silica-coated type identified as Code UB-5372, having a particle size substantially in the range of 2 to 6 microns. However, if the printed textiles are to be subjected to exposure to acid vapor or dipping in a weak acid solution, the acid-resistant type of Ultramarine Blue may be employed. The particle size indicated is average.

In the preparation of the oil phase of the color concentrate, a dry Ultramarine Blue pigment of the requisite particle size is intimately admixed with a solution of a resin binder in one or more organic solvents or diluents. The solution of the resin binder will generally contain from about 25% to about 45% by weight of resin solids, and preferably between about 30% and about 40% by weight, for example 32%. The resin content is dependent on the ratio of pigment to resin, which may vary from about 1.5:1 to about 3.5:1, and preferably about 2.5:1. The amount of pigment employed is such that its concentration in the color concentrate will lie between about 16.0% and about 24.0% by weight, anr preferably about 20.0%, but this will depend upon the use to which the color concentrate is to be put.

The resins which are useful as binders are preferably synthetic resins of the thermosetting type, that is, resins which by action of heat, oxidation, and/or catalysts, cure to form an insoluble binder which tenaciously adheres the pigment to the textile fibers. The binding action is effected between the resin component and the fibers since these pigments have themselves no affinity for the textile material. The resin component should be capable of providing a high degree of flexibility, good bonding strength and resistance to commercial and household laundry soaps and detergents, as well as to drycleaning solvents. They must also provide a soft hand in the fabric. They must be of such character that they do not of themselves alter or impair the color characteristics and tinting strength of the pigment.

Thermosetting resins and combinations thereof which are commonly used in textile ink manufacture and which may be utilized for the purposes of this invention include heat-convertible alkyd, oil modified alkyd, melamine-formaldehyde, urea-formaldehyde, acrylic, epoxy, and other resin types. Plasticizers, such as dibutyl phthalate or dioctyl phthalate may be incorporated into particular resins or resin combinations to impart flexibility and/or improved hand to the textile, usually in an amount less than about 10% by weight of the resin. Typical resin combinations which can be advantageously employed in the production of the color concentrates of the invention are illustrated in the following table:

TABLE 1.—RESIN COMBINATION

| No. | Resin Combination | Trade Name of Resin | Ratio by Weight-Solid Basis, percent |
|---|---|---|---|
| 1 | Epoxy resin ester | | 90 |
|   | Melamine formaldehyde | Cymel 245-8 | 10 |
| 2 | Non-Dry Alkyd Cocoanut oil modified | Aroplaz 6102-X-60 | 70 |
|   | Melamine Formaldehyde | Cymel 245-8 | 30 |
| 3 | Soya oil modified Alkyd Resin | Aroplaz 1081-M-50 | 87.5 |
|   | Melamine Formaldehyde | Cymel 245-8 | 12.5 |
| 4 | Epichlorhydrinbisphenol epoxy resin | Epon 1001 | 70 |
|   | Urea Formaldehyde | Beetle 227-8 | 30 |
| 5 | Styrenated Alkyd Resin | Cycopol S-101-1 | 85 |
|   | Melamine Formaldehyde | Cymel 245-8 | 15 |
| 6 | Acrylic Resin Thermosetting Type | Acryloid AT-50 | 77 |
|   | Epichlorhydrinbisphenol epoxy Resin | Epon 1001 | 13 |
|   | Tricresyl Phosphate (Plasticizer) | | 10 |
| 7 | Vinyl Toluene Alkyd | Cycopol 341-17 | 100 |

As solvent or solvent mixtures for the thermosetting resins there may be employed aliphatic hydrocarbons, including petroleum solvents such as mineral spirits and VMP naphtha, petroleum aromatic solvents, such as Solvesso No. 100, aromatic solvent having a boiling range 310°–365° F., and a KB value of 91, aromatic solvents having a KB value of 92–100 such as xylene, and acyclic alcohols, ketones, and ethers, such as butanol, methyl isobutyl ketone, and "Methylcellosolve" (ethylene glycol monomethyl ether). The solvent mixtures will vary with the resins used and may be adjusted accordingly, but must be capable of dissolving the resin completely. Examples of solvent mixtures coresponding to the resin combinations listed in Table 1, are shown in Table 2:

TABLE 2.—SOLVENT MIXTURES FOR RESIN COMBINATIONS NO. 1–7
[32% resin—68% solvent]

Resin combination—No. 1: Percent by weight
    Xylene ------------------------------ 56.0
    VMP naphtha ------------------------ 8.8
    Butanol ----------------------------- 2.2
    Solvesso 100 ------------------------ 20.0
    Mineral spirit ----------------------- 13.0

100.0

No. 2:
    Xylene ------------------------------ 58.8
    Butanol ----------------------------- 11.3
    Solvesso 100 ------------------------ 29.9

100.0

No. 3:
    Xylene ------------------------------ 26.5
    Butanol ----------------------------- 3.0
    Mineral spirit ----------------------- 70.5

100.0

No. 4:
    Xylene ------------------------------ 46.7
    Butanol ----------------------------- 21.0
    Methyl isobutyl ketone -------------- 32.3

100.0

TABLE 2—Continued

| | Percent by weight |
|---|---|
| No. 5: | |
| Xylene | 3.8 |
| Butanol | 12.5 |
| Solvesso 100 | 14.7 |
| Mineral spirit | 69.0 |
| | 100.0 |
| No. 6: | |
| Xylene | 66.0 |
| Butanol | 8.0 |
| Methyl Cellosolve | 6.5 |
| Methyl isobutyl ketone | 19.5 |
| | 100.0 |
| No. 7: | |
| Xylene | 17.6 |
| VMP naphtha | 47.0 |
| Mineral spirit | 35.4 |
| | 100.0 |

The aqueous phase of the color concentrate includes a combination of aqueous solutions of surfactants, stabilizers, thickeners, and anticrocking agents. These additives are individually of the type commonly employed in ink emulsions. However, the manner in which they are combined to form the color concentrate forms a part of the present invention.

The surfactant preferably consists of an equeous solution of one or more surface-active agents in water, the total concentration of surfactant being about 30% by weight. The surfactants may be anionic, cationic, or nonionic. Among the surfactants which may be employed are the sodium salts of high molecular weight fatty alcohol sulfates, such as sodiumlauryl sulfate, sodium lignin sulfonates, the dioctyl ester of sodium sulfosuccinic acid, polyalkylene oxide condensation products, such as polyethylene oxides, quaternary ammonium salts, the sodium sulfonates of oleic acid esters of aliphatic compounds, sodium salts of aryl alkyl polyether sulfonates, and the like. Examples of suitable surfactants, which are to be regarded as illustrative, and not as limiting, are given in Table 3:

TABLE 3.—SURFACTANTS FOR COLOR CONCENTRATE

| No. | Chemical Class | Type | Trade Name | Percent Active |
|---|---|---|---|---|
| 1 | Sodium lauryl sulphate. | Anionic | Duponol ME | 96 |
| 2 | Sodium dioctyl-sulfosuccinate. | do | Aerosol OT | 100 |
| 3 | Sodium salt of alkyl aryl polyether sulfate. | do | Triton 770 | 25 |
| 4 | Polyalkylene glycol ether. | Nonionic | Tergitol XD | 100 |
| 5 | Polyoxyethylated castor oil. | do | Emulphor EL-719 | 97 |
| 6 | Sodium alkylnaphthalene Sulfonate. | Anionic | Nekal BA-75 | 70 |

NOTE.—With exception of No. 3, the others are reduced to approximately 30% active with water.

The stabilizer solution used in preparing the color concentrate comprises a dilute aqueous solution of any suitable substance of this type. Preferably there is employed a 5% by weight solution of casein in water containing a sufficient amount of ammonia to dissolve the casein. There may be added to this solution, as a convenient means of introducing such materials, a fungicide, such as for example, sodium orthophenylphenate (Dowicide A) or sodium pentachlorophenate (Dowicide G), but any suitable fungicide may be used. There may also be incorporated in the casein solution a small amount of an antifoaming agent, the selection of which is conditioned upon the requirement that it should not affect the stability of the emulsion. A silicone oil of the type sold as SS-66 is well suited to this purpose. Thus, a typical formula for the casein type stabilizer solution is shown in Table 4:

TABLE 4.—CASEIN SOLUTION COMPOSITION

| Substance: | Parts by weight |
|---|---|
| Casein, solid basis | 1.400 |
| 28% ammonia | 0.084 |
| Dowicide A, solid basis | 0.011 |
| Dowicide G, solid basis | 0.011 |
| Antifoam SS-66 | 0.005 |
| Water | 26.489 |
| Total | 28.000 |

The thickener solution component of the aqueous phase of the color concentrate is an aqueous solution of a soluble thickener of the low viscosity type. Higher viscosity types may be used to adjust the viscosity of the final inks. Examples of thickening agents which may be employed include: methylcellulose, hydroxyethylcellulose, sodium carboxymethylceluose, and ammonium methacryate. These materials also function as protective colloids and/or auxiliary stabilizers for the emulsion inks. The amount of thickener is advantageously about 10% by weight of the solution.

The anticrocking agent solution component, or latex emulsion, provides a means for incorporating synthetic latices into the ink in order to improve crock resistance. These latices are thermoplastic resins or elastomers which may be polymers or copolymers of ethylenically unsaturated monomers of a wide variety of classes. Among the classes of such latices which have proved suitable for use in preparation of the color concentrates of the invention are polychloroprene (polymerized 2-chlorobutadiene-1.3), such as Neoprene 601-A, latices of vinyl polymers, such as polyvinyl chloride, and butadiene-acrylonitrile elastomers in the form of latices, such as Chemigum 245 CHS. These latices are adjusted to a solids content of approximately 42.5% forming an oil-in-water type emulsion for use in the present invention.

In the preparation of the color concentrate of the invention, these various components are combined in such manner that the dry pigment is first incorporated into the resin solution (oil phase) to form a thick paste. The solutions of casein and surfactant are mixed together separately, together with the thickener solution, to form the aqueous phase. This aqueous phase is then mixed with the pigment-resin paste to form an emulsion, and finally the latex emulsion is added and mixed thoroughly with the previously obtained emulsion.

In the color concentrate, the proportions of these various components may vary within reasonable limits, the typical range of variation and the preferred composition being shown in the following table:

TABLE 5.—COLOR CONCENTRATE FORMULATION

| Component | Parts by weight | |
|---|---|---|
| | Range | Preferred |
| Ultramarine Blue | 16-24 | 20 |
| 32% Resin Solution | 20-38 | 25 |
| 30% Surfactant Solution | 1-5 | 3 |
| 5% Casein Solution | 20-35 | 28 |
| 10% Thickener Solution | 8-20 | 14 |
| 42.5% Latex Emulsion | 7-14 | 10 |

In order to convert the color concentrate prepared as described above to a textile ink, there is added in accordance with the invention from about 6 to about 15 parts by weight of an oil-in-water type clear, i.e., unpigmented, extender emulsion. The extender must be capable of blending with the color concentrate emulsion without adverse effects. The extender comprises an aqueous emulsion of resins, latices, surfactants, stabilizers, thickeners, solvents, and the like, of the same general type as those disclosed previously for use in the preparation of the color concentrate. Typical formulations of extender concentrates, to which further additions of water and organic solvents may be made to adjust to desired concentration, are illustrated herewith, but are not to be regarded as limiting.

*Extender Formula 1 (concentrate)*

| Ingredient: | Parts by weight |
|---|---|
| Butadiene-acrylonitrile (42% solids) latex | 44.0 |
| Polyvinyl chloride latex (52% solids) | 27.0 |
| 15% Casein solution | 3.5 |
| 28% Ammonia | 0.4 |
| Silicone antifoam | 0.1 |
| Sodium lauryl sulfate (dry basis) | 4.0 |
| 40% Resin solution (90 spoxy ester/10 melamineformaldehyde) | 7.5 |
| Xylene | 8.5 |
| Mineral spirits | 3.0 |
| Methylcellulose 4000 cps. (dry basis) | 2.0 |
| Total | 100.0 |

*Extender Formula 2*

| Ingredient: | Parts by weight |
|---|---|
| Melamine-formaldehyde resin (50% solids) | 5.0 |
| Alkyd-coconut oil modified (60% solids) | 15.0 |
| Pine oil | 10.0 |
| Mineral spirits | 43.5 |
| Sodium lauryl sulfate (dry basis) | 2.5 |
| Water | 24.0 |
| Total | 100.0 |

*Extender Formula 3*

| Ingredient: | Parts by weight |
|---|---|
| Urea-formaldehyde resin (50% solids) | 5.0 |
| Short oil soya alkyd (55% solids) | 15.0 |
| Pine oil | 10.0 |
| Mineral Spirits | 23.5 |
| Aromatic petroleum solvent | 20.0 |
| Sodium lauryl sulfate (dry basis) | 2.5 |
| Water | 24.0 |
| Total | 100.0 |

The clear extender concentrate of Formula 1 can be further adjusted by the addition thereto of water and mineral spirits, thus:

| | Parts by weight |
|---|---|
| Extender concentrate Formula 1 | 10 |
| Water | 30 |
| Mineral spirits | 60 |
| Total | 100 |

The preparation of the color concentrates and textile printing inks of this invention is illustrated by the following examples, but the invention is not to be regarded as limited thereto:

EXAMPLE 1

Two hundred parts of acid resistant type Ultramarine Blue (silica-coated) are added to two hundred parts of a solution of 57.6 parts of Epoxy resin ester (Epi-Tex 120) and 6.4 parts of Melamine Formaldehyde resin (Cymel 245–8) in 136 parts of a solvent mixture consisting of

| | Parts |
|---|---|
| Xylene | 76 |
| VMP naphtha | 12 |
| Butanol | 3 |
| Aromatic solvent BR 310–365° F. (Solvesso 100) | 27 |
| Mineral spirit | 18 | and thoroughly mixed in a stainless steel beaker. The mixture is then given two passes over a three-roll mill.

Fifty parts of a similar resin solution are added and thoroughly mixed with the above to give a color-resin dispersion (A).

A casein solution is prepared as follows:

100 parts of casein are added slowly to 1892 parts of water, heated slowly to 60–70° C. and held at that temperature for one hour. Then there are added 6 parts of 28% aqueous ammonia, 0.4 part of silicone antifoam and 0.8 part of Dowicide A and 0.8 part Dowicide G, in that order, allowing each to dissolve before adding the next ingredient. The mixture is cooked to 40° C. or lower before using.

A surfactant solution is prepared as follows:

150 parts of Nekal BA–75 are added slowly to 350 parts of water and stirred until the Nekal is dissolved. 150 parts of Duponol ME slowly are added to 350 parts of water and stirred until dissolved. Mix 200 parts of Duponol ME solution and 100 parts of Nekal BA–75 solution to obtain the surfactant solution.

A thickener solution is prepared by adding 200 parts of Methocel (15 cps. type) to 600 parts of water at 80° C. and stirred until well dispersed. Then about 1000 parts of ice water are added and water is added to a total of 2000 parts.

There are mixed in an Eppenbach Mixer:

| | Parts |
|---|---|
| Casein solution | 280 |
| Surfactant solution | 30 |
| Thickener solution | 140 | then adding the 450 parts of color-resin dispersion (A) and mixing thoroughly to emulsify the product. 100 parts of a commercial butadiene-acrylonitrile latex (42.5% solids) such as Chemigum 245 CHS, are added.

This produces a new Ultramarine Blue textile ink color concentrate with superior properties as a textile printing medium in regard to crocking and acid resistance.

In use, the new ink is mixed 1:1, 1:10, 1:50, or any other ratio with a clear extender such as described above.

EXAMPLE II

Two hundred parts of Ultramarine Blue of a particle size substantially in the 0.5 to 5.0 micron range are added to two hundred parts of a solution of 44.8 parts of nondrying coconut oil modified alkyd (Aroplaz 6102–X–60) and 19.2 parts of Melamineformaldehyde resin (Cymel 245–8) in 136 parts of a solvent mixture consisting of 40 parts of xylene, 8 parts of Butanol and 20 parts of aromatic solvent (B.R. 310–365° F.) (Solvesso 100), and thoroughly mixed in a stainless steel beaker. The mixture is given two passes on a 3-roll mill, forming resin dispersion (B).

Fifty parts of a similar resin solution are added and thoroughly mixed with the above to give a color-resin dispersion (A).

There are prepared as in Example I, and mixed in an Eppenbach Mixer:

| | Parts |
|---|---|
| Casein solution | 280 |
| Surfactant solution | 30 |
| Thickener solution | 140 | then 450 parts of resin dispersion are added and mixed thoroughly to emulsify the product. 100 parts of a commercial polyvinyl chloride latex (42.5% solids) such as Geon 552 are added and mixed thoroughly.

This produces a new Ultramarine Blue textile ink color concentrate with superior properties as a textile printing medium in regard to crocking.

EXAMPLE III

The resin solution used in the color-resin dispersion (B) in Example II may be replaced by equivalent quantities of resin mixtures 3, 4, 5, 6 or 7 (Table I) in respective solvent mixtures 3, 4, 5, 6 or 7 (Table II).

EXAMPLE IV

There are mixed in an Eppenbach Mixer:

| | Parts |
|---|---|
| Casein solution (Example I) | 350 |
| Surfactant solution (Example I) | 10 |
| Thickener solution (Example I) | 200 |

360 parts of color-resin dispersion (A) (Example I) are added and emulsified with the product. 70 parts of a commercial polychloroprene latex (42.5% solids) such as Neoprene 601–A are added and mixed thoroughly.

A new Utramarine Blue textile ink color concentrate with superior properties as a textile printing agent in regard to crocking and acid resistance results.

EXAMPLE V

There are mixed in an Eppenbach Mixer:

| | Parts |
|---|---|
| Casein solution (Example I) | 200 |
| Surfactant solution (Example I) | 45 |
| Thickener solution (Example I) | 75 |

540 parts of color-resin dispersion (B) (Example II) are added and emulsified with the product. 140 parts of a commercial polyvinyl chloride latex (42.5% solids) such as Geon 552 are added and mixed thoroughly.

The Utramarine Blue textile ink color concentrate so produced will make textile prints with outstanding resistance to crocking.

EXAMPLE VI

To the color concentrate of Example I there were added, respectively, 6 and 15 parts by weight of the clear extenders formulations 1, 2, and 3, disclosed on page 15, to form textile printing inks, which were tested as described below.

EXAMPLE VII

A cotton textile fabric was printed with the printing inks of Example VI on a standard laboratory textile printing machine and then the print was cured at 300° F. for 10 minutes. A strong blue print was obtained.

The superior results obtainable by using the Ultramarine Blue printing inks of the present invention in comparison with known types of water-in-oil and oil-in-water emulsions are shown by the following test data.

The test methods employed may be briefly described as follows:

The AATCC (American Association of Textile Chemists and Colorists) Test Method was used for all tests except the acid vapor and acid dip tests.

(1) AATCC 61–1960—IV A

Colorfastness of textile to commercial laundering and domestic washing. Accelerated tests. Tentative test method.

(2) AATCC 8–1957

Colorfastness to crocking (rubbing) standard test method.

(3) Acid Vapor Test

The test specimen is exposed for one minute in a mixture of formic and acetic acid vapor having a pH of 3.0 to 4.0. This acid vapor may be obtained by boiling a one-to-one mixture of 10% formic acid and 10% acetic acid. Immediately after the exposure in the vapor the test specimen is thoroughly rinsed with cold water, dried and pressed with a low heat iron.

(4) Acid Dip Test

The test specimen is dipped into boiling ½% oxalic acid solution for 30 seconds. It is then rinsed thoroughly in cold water, dried and pressed with a low heat iron.

The results were rated by means of two sets of scales described in Part III, Section 2, 1960 Technical Manual of AATCC. These were modified to represent gradations from 10 downward.

(1) The International Geometric Gray Scale—for assessing the fastness of the Accelerated Wash Test and the Acid Resistance Tests.

(2) The Geometric Staining Scale—for determining the degree of staining in the Colorfastness to Crocking Test.

Words used to express the relative fastness and staining are as follows:

| Scale Reading | | Fastness in Terms of Color Change | Staining in Terms of Degree of Staining |
|---|---|---|---|
| AATCC | Modified AATCC | | |
| 5 | 10 | No change. | No stain. |
| | 9 | Trace change. | Trace stain. |
| 4 | 8 | Trifle change. | Trifle stain. |
| | 7 | Slight change. | Slight stain. |
| 3 | 6 | Noticable change. | Noticeable stain. |
| 2 | 4 | Considerable change. | Considerable stain. |
| 1 | 2 | Heavy change. | Heavy stain. |
| | 1 | Complete change. | Complete stain. |

NOTE.—In each comparison the strongest original print is taken as the standard and given the Scale Reading of 10. Other specimens are then compared with the Standard and rated accordingly.

In carrying out the tests, textile test prints were made on a standard laboratory type textile printing machine in accordance with conventional procedures, using a curing temperature of 300° F. and time of 10–20 minutes.

A test series was carried out to compare the printing ink prepared as described in Example 1, with an oil-in-water ink made in accordance with previously known methods, and with a commercially available water-in-oil ink. The two oil-in-water inks had identical formulas, but differed in their method of preparation. The same grade of Ultramarine Blue pigment was used for both oil-in-water emulsions. For the preparation of the conventional oil-in-water emulsion, the pigment was first dispersed in the casein solution and surfactant solutions by premixing, and the mixture was given two passes through a colloid mill. The dispersed pigment pulp was then premixed with thickener and this water phase mixture was emulsified with the resin solution in an Eppenbach mixer until a homogeneous emulsion was formed. Latex emulsion was then added and admixed thoroughly. The product is designated for test purposes as Conventional O/W Ink.

The results of these comparative tests are shown in the following table:

TABLE 6.—COMPARATIVE GRAY SCALE RATINGS

| Test Method | Example I Ink | Conventional O/W Ink | Commercial W/O Ink |
|---|---|---|---|
| Original Print | 10 | 10 | 10 |
| AATCC IV-A Wash Color Change | 7 | 4 | 5 |
| Acid Dip Color Change | 8 | 7 | 2 |

A second test series was performed to compare the ink of Example I with a conventional oil-in-water ink, with a commercial water-in-oil ink and with a laboratory prepared water-in-oil ink using the same Ultramarine Blue pigment as in Example I, in order to show color change and degree of staining. The results are set forth in Table 7:

TABLE 7.—COMPARATIVE COLOR CHANGE AND DEGREE OF STAINING

| AATCC Test Method | Ratings | | | |
|---|---|---|---|---|
| | Example I Ink | Conventional O/W Ink | Commercial W/O Ink | Lab. W/O Ink |
| Original Print Gray Scale Values | 10 | 10 | 10 | 10 |
| No. IV A Wash Gray Scale Values | 7 | 4 | 7 | 6 |
| Crock Test Staining Scale Values: | | | | |
| Dry | 8 | 5 | 4 | 4 |
| Wet | 5 | 4 | 2 | 2 |

The test data contained in Tables 6 and 7 clearly demonstrate the superiority of the oil-in-water type of emulsions prepared in accordance with this invention to the Utramarine Blue inks of the heretofore known types used for comparison.

I claim:
1. A coloring composition for textile fibers and fabrics comprising an aqueous dispersion of the oil-in-water type in which an Ultramarine Blue pigment, prewetted in its hydrophilic state by a petroleum solvent-containing oil phase, and resin-bonded with a thermosetting synthetic resin, is present substantially entirely in the discontinuous phase of the dispersion.

2. A textile printing composition of the oil-in-water dispersion type which comprises a discontinuous phase including a mixture of an Ultramarine Blue pigment, a thermosetting synthetic resin binder for said pigment, and an organic diluent which contains a petroleum solvent and in which said resin binder is completely dissolved, said pigment having been prewetted in its hydrophilic state with said diluent and binder, said mixture being dispersed in an aqueous phase, said aqueous phase containing a surfactant.

3. The composition of claim 2 in which the pigment is a silica-coated Ultramarine Blue.

4. The composition of claim 2 in which said synthetic resin binder is a member of the group consisting of heat-convertible alkyd, melamine-formaldehyde, urea-formaldehyde and epichlorhydrin-bisphenol epoxy resins and combinations thereof, the aqueous phase further contains casein as a stabilizer, a thickener selected from the group consisting of methylcellulose, hydroxyethylcellulose, sodium carboxymethylcellulose and ammonium methacrylate, and an anticrocking agent which is a latex of a polymer of an ethylenically unsaturated monomer.

5. An Ultramarine Blue printing ink color concentrate comprising an oil-in-water type dispersion, including as the discontinuous phase from about 20% to about 38% by weight of a solution of about 32% of a thermosetting synthetic resin in hydrocarbon-containing organic solvent for said resin, between about 16% and about 24% by weight of an Ultramarine Blue pigment, said pigment having been prewetted in its hydrophilic state with said solution and being present substantially entirely in said discontinuous phase, and including in the aqueous phase from about 20% to about 35% by weight of an approximately 5% aqueous solution of casein, from about 1% to about 5% by weight of an approximately 30% aqueous solution of a surfactant, from about 8% to about 20% by weight of an approximately 10% aqueous solution of a thickener, and from about 7% to about 14% by weight of an approximately 42.5% aqueous latex emulsion.

6. An Ultramarine Blue textile printing ink which is resistant to washing and crocking comprising the composition of claim 5 in combination with from about 1 to about 50 parts by weight of an unpigmented oil-in-water emulsion extender.

7. An Ultramarine Blue printing ink color concentrate comprising an oil-in-water type dispersion, including as the discontinuous phase about 25% by weight of a solution of about 32% of thermosetting synthetic resin binder which comprises a heat-convertible alkyd resin in hydrocarbon-containing organic solvent for said resin, about 20% by weight of an Ultramarine Blue pigment, said pigment having been prewetted in its hydrophilic state with said solution and being present substantially entirely in said discontinuous phase, and including in the aqueous phase about 28% by weight of an approximately 5% aqueous solution of casein, about 3% by weight of an approximately 30% aqueous solution of a surfactant, about 14% by weight of an approximately 10% solution of methyl-cellulose as a thickener, and about 10% by weight of an approximately 42.5% aqueous latex emulsion.

8. The process of preparing a coloring composition of the oil-in-water dispersion type for textile fibers and fabrics which comprises the steps of incorporating an Ultramarine Blue pigment in dry and hydrophilic form into a solution of a thermosetting synthetic resin binder for said pigment in solution in hydrocarbon-containing organic solvent for said resin to form a paste, and dispersing the resulting paste into an aqueous phase containing a surfactant to form a color concentrate in which the pigment is present substantially entirely in the discontinuous phase.

9. The process of preparing a coloring composition of the oil-in-water dispersion type for textile fibers and fabrics which comprises the steps of forming a solution of a thermosetting synthetic resin in a hydrocarbon-containing organic solvent therefor said thermosetting resin being a member of the group consisting of heat-convertible alkyd, melamine-formaldehyde, urea-formaldehyde and epichlorhydrinbisphenol epoxy resins and combinations thereof, intimately mixing an Ultramarine Blue pigment in its hyldrophilic form with said resin solution to form a paste, mixing together aqueous solutions of a surfactant, and a thickener selected from the group consisting of methylcellulose, hydroxyethylcellulose, sodium carboxymethylcellulose and ammonium methacrylate to form an aqueous phase, dispersing the pigment paste in said equeous phase, and admixing with the resulting dispersion an oil-in-water emulsion of anti-crocking agent to form a color concentrate, said anti-crocking agent being a latex of a polymer of an ethylenically unsaturated monomer.

10. The process of claim 9 in wihch the pigment is a silica-coated Ultramarine Blue and is present in said composition to provide therein a pigment/resin ratio of about 2.5/1.

11. The process of claim 10 in which there is further added to the color concentrate a clear oil-in-water emulsion extender.

12. The process of coloring a cotton textile fabric which comprises the steps of incorporating a silica-coated Ultramarine Blue pigment in dry and hydrophilic form into a solution of a thermosetting synthetic resin binder in solution in a hydrocarbon-containing solvent for said resin to form a pigment paste; mixing together aqueous solutions of a surfactant, a stabilizer, and a thickener to form an aqueous phase; dispersing the pigment paste in said aqueous phase and admixing with the resulting dispersion an oil-in-water emulsion of an anticrocking agent which is a latex of a polymer of an ethylenically unsaturated monomer and a clear oil-in-water emulsion extender to form a printing ink in the form of an oil-in-water dispersion in which the pigment is present substantially entirely in the discontinuous oil phase; printing the resulting ink upon a cotton textile fabric; and curing the printed fabric by application of heat thereto at a temperature between about 280° and 320° F. to render said resin binder insoluble and nondispersible.

13. A coloring composition for textile fibers and fabrics which comprises an aqueous dispersion of the oil-in-water type in which an Ultramarine Blue pigment, prewetted in its hydrophilic state by a petroleum solvent-containing oil phase and bonded with a thermosetting resin selected from the group consisting of heat-convertible alkyd, melamine-formaldehyde, urea-formaldehyde and epichlorhydrin-bisphenol epoxy resins and combinations thereof, is present substanatially entirely in the discontinuous phase of the dispersion.

14. A coloring composition for textile fibers and fabrics comprising an aqueous dispersion of the oil-in-water type in which an Ultramarine Blue pigment, prewetted in its hydrophilic state by a petroleum solvent-containing oil phase which contains a heat-convertible alkyd resin as a binder, is present substantially entirely in the discontinuous phase of the dispersion.

References Cited by the Examiner

UNITED STATES PATENTS

| | | | |
|---|---|---|---|
| 2,379,070 | 6/1945 | Evans et al. | 260—34.2 |
| 2,440,953 | 5/1948 | Iliff et al. | 260—29.2 |
| 2,649,388 | 8/1953 | Wills et al. | 106—305 |

OTHER REFERENCES

Ellis: Printing Inks (1940), Reinhold Publishing Corp., N.Y., pages 325, 410.

Smith: The Textile Manufacturer, September 1955, pages 486–487.

WILLIAM H. SHORT, *Primary Examiner.*

MILTON STERMAN, *Examiner.*